(12) United States Patent
Kurth et al.

(10) Patent No.: US 10,935,119 B2
(45) Date of Patent: Mar. 2, 2021

(54) EPICYCLIC GEARING, IN PARTICULAR REDUCTION GEARING WITH AN INTEGRATED SPUR GEAR DIFFERENTIAL

(71) Applicant: SCHAEFFLER TECHNOLOGIES AG & CO. KG, Herzogenaurach (DE)

(72) Inventors: Franz Kurth, Nuremberg (DE); Manfred Goetz, Memmelsdorf (DE); Ralph Schimpf, Fuerth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/326,075

(22) PCT Filed: Jul. 31, 2017

(86) PCT No.: PCT/DE2017/100637
§ 371 (c)(1),
(2) Date: Feb. 15, 2019

(87) PCT Pub. No.: WO2018/046042
PCT Pub. Date: Mar. 15, 2018

(65) Prior Publication Data
US 2019/0186609 A1   Jun. 20, 2019

(30) Foreign Application Priority Data
Sep. 6, 2016 (DE) ................... 10 2016 216 785.5

(51) Int. Cl.
*F16H 48/10* (2012.01)
*F16H 48/40* (2012.01)
(Continued)

(52) U.S. Cl.
CPC ............. *F16H 48/40* (2013.01); *F16H 48/11* (2013.01); *F16H 57/082* (2013.01); *F16H 2048/106* (2013.01)

(58) Field of Classification Search
CPC ........ F16H 48/40; F16H 57/082; F16H 48/11; F16H 2048/106
See application file for complete search history.

(56) References Cited

U.S. PATENT DOCUMENTS 3,527,121 A * 9/1970 Moore ................... F16H 57/082
475/338
3,939,736 A   2/1976 Morin
(Continued)

FOREIGN PATENT DOCUMENTS

DE       7401523 U    5/1975
DE      10049564 A1   4/2001
(Continued)

OTHER PUBLICATIONS

International Search Report for PCT Application No. PCT/DE2017/100637, dated Nov. 13, 2017, 5 pages.

*Primary Examiner* — David J Hlavka
(74) *Attorney, Agent, or Firm* — Brooks Kushman P.C.

(57) ABSTRACT

An epicyclic gearing that includes a first set of planet gears arranged on a first planet gear plane, a second set of planet gears arranged on a second planet gear plane, and a planet carrier configured to circulate about a gear axis and including a carrier wall that extends between the first planet gear plane and the second planet gear plane in an intermediate region, and the planet carrier further includes planet pins configured to mount the first or second set of planet gears, wherein a web structure is attached to the carrier wall, wherein the web structure extends in the direction of the gear axis, wherein the web structure includes a support structure that extends radially in relation to the gear axis, and a support structure that includes a hole for receiving a section of a planet gear pin.

17 Claims, 2 Drawing Sheets

(51) Int. Cl.
*F16H 48/11* (2012.01)
*F16H 57/08* (2006.01)

(56) References Cited

U.S. PATENT DOCUMENTS

| | | | | |
|---|---|---|---|---|
| 4,187,740 | A * | 2/1980 | Silvestri | F16H 57/082 |
| | | | | 475/338 |
| 6,422,971 | B1 | 7/2002 | Katou et al. | |
| 6,931,959 | B2 * | 8/2005 | Giuriati | F16H 57/082 |
| | | | | 475/331 |
| 6,986,726 | B2 | 1/2006 | Simon | |
| 7,033,301 | B2 * | 4/2006 | Kimes | F16H 57/082 |
| | | | | 475/331 |
| 2015/0045170 | A1 | 2/2015 | Ohmura et al. | |
| 2015/0377334 | A1 * | 12/2015 | Swales | F16H 48/10 |
| | | | | 475/220 |

FOREIGN PATENT DOCUMENTS

| | | |
|---|---|---|
| DE | 102005006649 A1 | 9/2005 |
| DE | 102012222223 A1 | 6/2014 |
| DE | 102015214035 A1 | 1/2017 |

* cited by examiner

EPICYCLIC GEARING, IN PARTICULAR REDUCTION GEARING WITH AN INTEGRATED SPUR GEAR DIFFERENTIAL

CROSS-REFERENCE TO RELATED APPLICATIONS

This application is the U.S. National Phase of PCT/DE2017/100637 filed Jul. 31, 2017, which claims priority to DE 102016216785.5 filed Sep. 6, 2016, the entire disclosures of which are incorporated by reference herein.

TECHNICAL FIELD

The disclosure relates to an epicyclic gearing with a planet carrier supporting planet gears in a first planet gear plane and planet gears in a second planet gear plane, wherein a least one planet gear in the first planet gear assembly is coupled to a planet gear in the second planet gear assembly in the region of the planet carrier. In particular, the disclosure relates to a design for this epicyclic gearing for an electromechanical motor vehicle, wherein the epicyclic gearing is a reduction gearing with an integrated spur gear differential.

BACKGROUND

An epicyclic gearing is known from DE 10049564 A. In this known gearing, the planet carrier is composed of a base element and a cover placed thereon. The base element forms pockets in which the planet gears of a first planet gear sit. The planet gears of the second planet gear set sit in an intermediate space between the base element and the cover. The coupling of the cover to the base element is obtained by webs forming an integral part of the base element, which span the second planet gear plane.

A planet carrier for an epicyclic gearing is known from DE 740 15 23 A, which likewise supports planet gears in two planet gear planes, wherein the planet carrier forms an integral component with three axially sequential walls, each of which supports planet gear pins.

SUMMARY

An object of the disclosure is to create an epicyclic gearing that advantageously supports its planet gears radially, and which is distinguished by a robust, compact and inexpensive construction.

This problem may be solved according to the disclosure by an epicyclic gearing that has:

first planet gears in a first planet gear plane, second planet gears in a second planet gear plane, a planet carrier that rotates about a gear axis, with a carrier wall extending in an intermediate space between the first planet gear plane and the second planet gear plane, and planet gear pins for supporting the first and/or second planet gears, wherein a web structure is attached to the carrier wall that extends in the direction of the gear axis, the web structure has a support structure that extends radially in relation to the gear axis, the support structure has a hole for receiving a section of a planet gear pin, the planet gear pins form an axial excess on a side of the support structure facing away from the support wall, and this excess passes through a hole in a carrier plate placed on the support structure.

As a result, it may become possible to create an epicyclic gearing in which the decisive geometry for the positioning of the first and/or second gear planes can be formed on a single, rigid integral component, and an additional support of the planet gear pins and force transfer can be obtained therefrom via the carrier plate placed thereon.

The planet carrier can be designed such that it may include a first carrier wall section, a second carrier wall section, and a third carrier wall section. The first carrier wall section and the second carrier wall section may be formed by a base element as an integral part thereof, while the third carrier wall section is formed by the carrier plate placed on the integral component.

The carrier wall specified above, supporting the web structure, corresponds to the second carrier wall section, located axially between the first and second carrier wall sections.

The carrier plate representing the third carrier wall section can then form a cover element, which closes off the second planet gear plane on a side facing away from the (middle) carrier wall section. This cover element then supports the sections of the planet gear pins passing through corresponding holes in the cover element.

The web structures extending in the direction of the gear axis and the support structures that they carry may be designed such that they become increasingly spaced apart along the circumference and form pockets extending into the second planet gear plane. The web structures form the pocket walls and the support structures form the bases of the pockets.

The pockets formed by the web and support structures may then be closed in an end region facing away from the first carrier wall section by their bases. A planet gear of the second planet gear plane is received in each of the respective pockets formed by the web and support structures. The carrier plate that functions as a cover element is then placed on the cover seating surface of the base of the pocket, which faces away from the interior of the pocket.

According to one embodiment of the disclosure, the first and second planet gears are supported on planet gear pins, which are received in holes in the base element with a precision fit. The planet gears may be supported by roller bearings, in particular needle bearings, on each planet gear pin.

The epicyclic gearing according to the disclosure may be designed such that the first carrier wall section, the second carrier wall section, the pocket walls, and the pocket base are formed by and integral component. This integral component may be made in turn of a casting compound, in particular a spheroidal graphite cast iron. Alternatively, it is also possible for the integral component to be a forged component or welded component, e.g. made of numerous pieces of sheet metal.

According to an embodiment of the disclosure, the base element is designed such that the respective pocket base has a receiving hole in it, in which a corresponding section of a planet gear pin is seated.

According to a special aspect of the present disclosure, it is possible to extend the respective planet gear pin such that it rises above the cover seating surface formed by the pocket base on a side facing away from the interior of the pocket, wherein the cover element then receives the excess of the respective planet gear pin in a corresponding fitted hole. This results in a precise positioning of the cover element and a robust, non-rotatable coupling of the cover element to the base element. In addition, the cover element also contributes to the stability with regard to supporting the sections of the planet gear pins seated in the bases of the pockets.

According to another special aspect of the present disclosure it is possible to configure the epicyclic gearing such that the second planet gear plane accommodates the components of a spur gear differential gearing in an intermediate region lying between the pockets. This results, in a particularly advantageous manner, in the possibility of providing a branched power pickup from the epicyclic gearing in that planet gear plane, in which a torque is increased via the second planet gears. A sun gear of the spur gear differential gearing can be located between the bases of the pockets, at the same axial level as these bases. This structural space can thus also be used for implementing a high component density. The cover element placed on the bases of the pockets then closes off the second planet gear plane.

The pockets may be designed such that each of the pockets generates a structure with a U-shaped radial cross section, wherein the planet gear received therein is then a spur gear, the toothing of which is exposed in sections toward the circumference of the base element. This planet gear can engage radially in a hollow shaft from the inside, which extends into the second planet gear plane and encompasses the planet carrier coaxially.

A particularly high fundamental translation of the epicyclic gearing can advantageously be obtained in that the planet gear received in the respective pocket is coupled to a planet gear rotating about the same axis in the first planet gear plane for conjoint rotation therewith. The first planet gear in the first planet gear plane may have a greater diameter than the second planet gear. The first and second planet gears can be stepped planet gears, formed as a single-piece planet gear, or formed by two individual gears joined for conjoint rotation.

The cover element can be designed such that it has a bearing hole for receiving a bearing mechanism that is concentric to the rotational axis of the planet carrier. A shaft or sun gear rotating about the same axis as the axis for the bearing can then be radially supported in this bearing mechanism. The planet carrier can also be radially supported by this cover element.

According to another special aspect of the present disclosure, it is also possible to design the cover element with a toothing on the outer circumference thereof, enabling implementation of a parking brake gear, which can be shifted to a fixed position via a locking element.

There are two planet gear sets in the epicyclic gearing according to the disclosure. These planet gear sets are accommodated collectively in the planet carrier, in adjacent first and second, axially sequential, planet gear planes, wherein a first planet gear set of the first planet gear plane also extends over the second planet gear plane, and is functionally meshed therein with the other planet gear set. The planet carrier in the epicyclic gearing according to the disclosure forms at least one pocket for one of the extended planet gear, and the base of this pocket also has an eyelet for supporting the pin for this extended planet gear. The pin extends axially through the eyelet of the base of the pocket functioning as a web, and into another eyelet in the cover element. The planet gear extending over both planet gear planes can be a stepped planet gear, or "elongated" planet gear, in particular.

BRIEF DESCRIPTION OF THE DRAWINGS

Further details and features of the disclosure can be derived from the following description in conjunction with the drawings. Therein.

DETAILED DESCRIPTION

Figure 1:
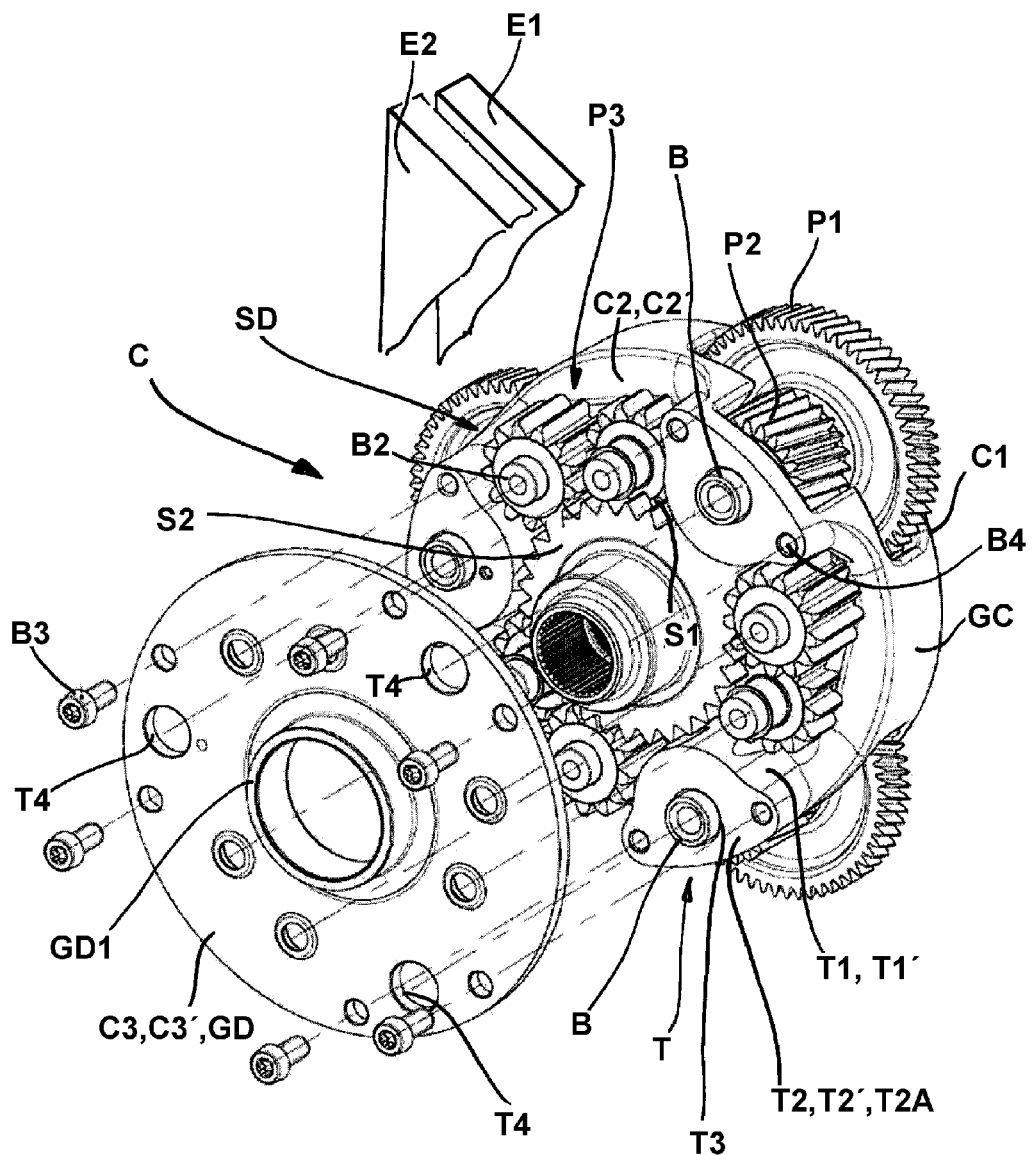
FIG. 1 shows a perspective exploded view illustrating the construction of an epicyclic gearing according to the disclosure, with a planet carrier that supports a first and second planet gear assembly in axially sequential planet gear planes.

The illustration in FIG. 1 shows an exemplary embodiment of a first embodiment of an epicyclic gearing for a motor vehicle according to the disclosure.

This epicyclic gearing comprises first planet gears P1 in a first planet gear plane E1, second planet gears P2 in a second planet gear plane E2, a planet carrier C that revolves about a gear axis, with a carrier wall C2' extending in an intermediate space between the first planet gear plane E1 and the second planet gear plane E2, and planet gear pins B for supporting the first and/or second planet gears P1, P2.

The epicyclic gearing according to the disclosure is designed such that the carrier wall C2' supports a web structure T1' that extends in the direction of the gear axis X, wherein the web structure T1' supports a support structure T2A that extends radially in relation to the gear axis X, and the support structure T2A has a hole T3 for receiving a section of the planet gear pin B. The planet gear pins B are incorporated in the epicyclic gearing such that they form an axial excess on the side of the structure facing away from the carrier wall C2', wherein this respective excess passes through a hole T4 in a carrier plate C3', which is placed on the support structure T2A.

The web structure T1' and the support structure T2A form a pocket T supported by the carrier wall C2', wherein the web structure T1' forms a pocket wall T1 of the respective pocket T that extends axially, and the support structure T2A forms the pocket base T2 in an end region of the pocket T facing away from the carrier wall C2', which closes the pocket T.

A second planet gear P2 of the second planet gear plane E2 is received in the respective pocket T, and the carrier plate C3' forms a cover element GD that is placed on the pocket base T2 on the respective cover seating surface facing away from the interior of the pocket.

The planet carrier may include a first carrier wall section C1, a second carrier wall section C2, and a third carrier wall section C3, wherein the first and second carrier wall sections, as well as the pocket wall T1 and the pocket base T2 are formed by a single-piece base element GC, and the third carrier wall section C3 is formed by the carrier plate C3', which is placed on the pocket base T2 formed by the base element GC.

The first and second planet gears P1, P2 are supported on the planet gear pins B via needle bearings. The first carrier wall section C1, the second carrier wall section C2, the pocket walls T1, and the pocket base T2 are formed by an integral component GC, made in this case of a casting compound.

The respective pocket base T2 forms a receiving hole T3 in which a corresponding section of a planet gear pin B is seated tightly. The respective planet gear pin B is extended such that it rises at the side facing away from the interior of the pocket over the cover seating surface T2' formed by the pocket base T2. The cover GD receives the excess of the respective planet gear pin B in a corresponding hole T4.

The second planet gear plane E2 accommodates the components of a spur gear differential gearing SD in an intermediate space between the pockets T. This spur gear differential gearing comprises a planet gear assembly P3 that extends into the second planet gear plane E2, and a first and second sun gear S1, S2. The two sun gears S1, S2 are coupled via the planet gear assembly P3 such that they rotate in opposite directions. The planet gears of the planet gear assembly P3 are likewise supported on the planet carrier C via planet gear pins B2. These planet gear pins B2 are seated in holes in the second carrier wall section C2 and the third carrier wall section C3. The axial position of the second sun gear S2 is determined such that it extends at the axial level of the pocket base T2. The spur gear differential SD is constructed such that when a profile shift has been obtained at the sun gears S1, S2, the planet gears of the planet gear assembly P3 mesh with one another at the axial level of the first sun gear S1, such that the "elongated" planet gear, which engages radially from the outside with the second sun gear S2, does not collide with the first sun gear S1. With regard to this gearing concept, in particular with regard to the meshing of the planet gears and the sun gears, reference is made to DE 10 2012 222 223 A1 by the same applicant. A special aspect of the epicyclic gearing described therein is that the structural space remaining between the pockets inside the second planet gear plane E2 receives the components of the spur gear differential gearing in the second planet gear plane.

The pocket bases T2 extend at an axial level, as described above, in which the sun gear S2 of the spur gear differential gearing SD is located. The cover element GD functions as an axial stop and radial bearing support for this second sun gear S2 and closes off the second planet gear plane E2 axially.

Each of the pockets T forms a structure with a U-shaped radial cross section. The planet gear P2 in this pocket is a spur gear, the toothing of which is partially exposed toward the circumference of the base element GC. The pocket wall T1 is relatively close to the circumference of the planet gear P2. This planet gear P2 engages radially from the inside with a hollow shaft, not shown in detail herein, which extends into the second planet gear plane E2. The planet gear P2 received in the respective pocket T2 is coupled via a shaft pin to a planet gear P1 rotating about the same axis in the first planet gear plane for conjoint rotation therewith. These planet gears P1, P2 can also be single-piece stepped planet gears, or so-called "long" planet gears, and planet gears comprising two gear planes.

Figure 2:
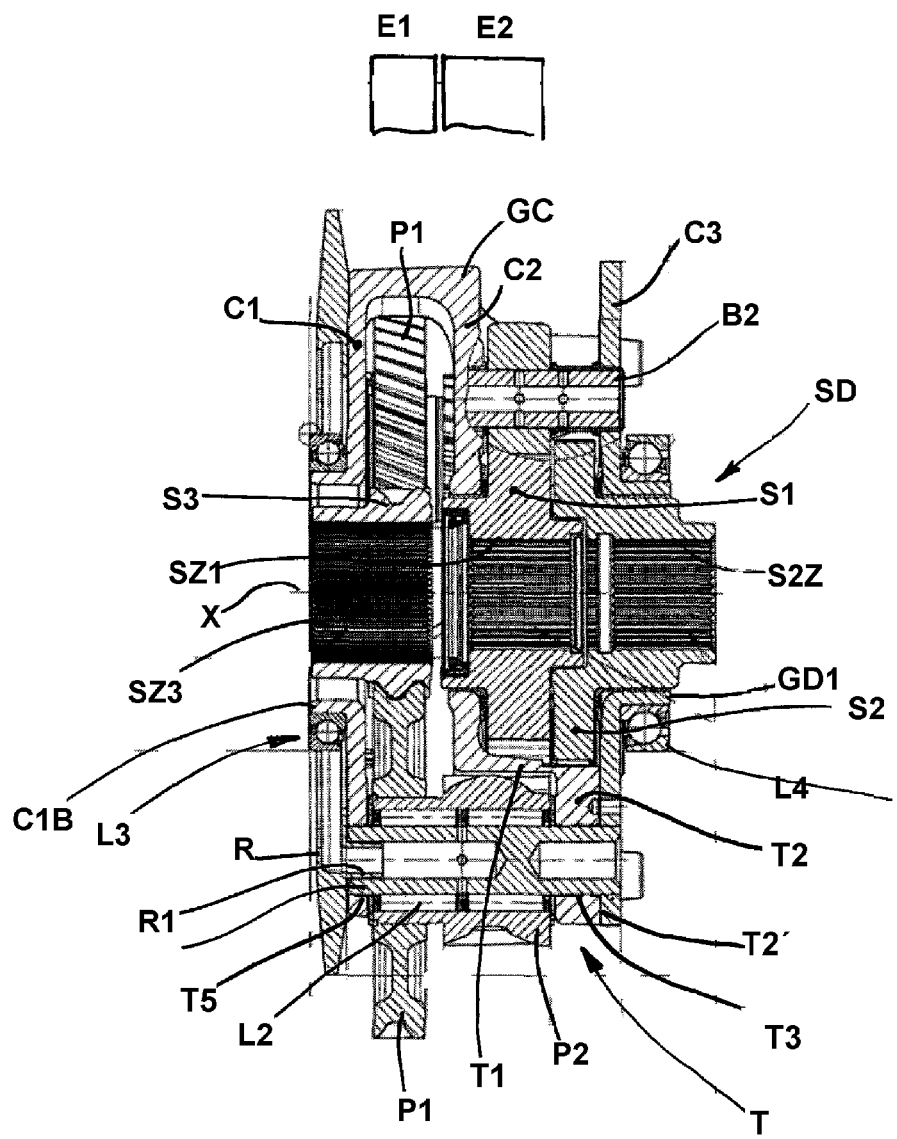
FIG. 2 shows an axial sectional view further illustrating the construction of the epicyclic gearing according to the disclosure.

The cover element GD has a bearing hole in which a flange section of the second sun gear S2 is rotatably supported. This bearing hole has collar GD1. There is a roller bearing L4 seated on this collar GD1, as can be seen in FIG. 2, for radially supporting the planet carrier C. Even if it cannot be seen therein, it is possible to provide the cover element GD with a toothing, and to implement a parking brake gear via the cover element GD.

The axial securing of the cover element GD can be obtained with screws B3, which are then screwed into threaded holes B4 formed in the walls of the pockets T.

FIG. 2 illustrates the structure of the epicyclic gearing according to the disclosure in an axial cross section. As explained above in reference to FIG. 1, the epicyclic gearing comprises first planet gears P1 in the first planet gear plane E1, second planet gears P2 in the second planet gear plane E2, and a planet carrier C. The planet carrier C comprises a first carrier wall section C1 forming a first radially braced wall, a second carrier wall section C2 forming a second radially braced wall, which is spaced axially apart from the first carrier wall section C1, and a third carrier wall section C3 forming a third radially braced wall, which is spaced axially apart from the second carrier wall section C2.

The first and second carrier wall sections C1, C2 are formed by the base element GC, and the third wall section C3 is formed by a cover element GD. The second carrier wall section C2 supports numerous pockets T, spaced apart over the circumference, each of which has pocket walls T1 extending axially into the second planet gear plane E2, and are closed off in an end region facing away from the first carrier wall section C1 by radially extending pocket bases T2. A planet gear P2 of the second planet gear plane E2 is received in the respective pocket T, and the cover element C3 is placed on the pocket base T2 on each of the cover seating surfaces T2' facing away from the pocket interior.

The first and second planet gears P1, P2 are supported on planet gear pins B via needle bearings L2. The first carrier wall section C1, the second carrier wall section C2, the pocket walls T1, and the pocket bases T2 are formed by the integral component GC made of a casting compound.

The planet gears P1 in the first planet gear plane E1 are coupled in a torsionally rigid manner to the planet gears P2 in the second planet gear plane E2. This tooth structure, axially spanning the two planes E1, E2 forms a stepped planet gear. The drive for the stepped planet gear is provided by a sun gear S3, which meshes radially from the inside with the planet gears P1 in the first planet gear plane E1. The second planet gears P2 mesh radially from the inside with a stationary hollow shaft, not shown in detail, which extends into the second planet gear plane E2. The pocket T accommodating the second planet gear P2 is open axially toward the first planet gear P1. The stepped planet gear formed by the two planet gears P1, P2 is supported radially in the first carrier wall C1 and in the eyelet in the pocket base T2. The spur gear differential gearing S2 is received in the interior space of the planet carrier remaining between the pockets T. The sun gears S1, S2 are centered to one another, and also supported radially in the second carrier wall section C2 as well as the third carrier wall section C3. These two carrier wall sections C2, C3 also form the axial stop for these two sun gears S1, S2 of the spur gear differential gearing.

The planet gear pins B pass through the pocket bases T2 axially, and form an excess. This excess then engages in a precision hole in the cover GD and centers it through a non-rotatable coupling thereof with the base element GC.

The planet gear pins B are provided with central bore holes for supplying lubricant to the region of the bearing L2. The supply of lubricant is obtained through a core lifter ring R that forms a core channel, open radially toward the interior, which communicates with the interior of the planet gear pins B via spigot channels R1. The lubricant feed into the planet gear pins B is obtained through centrifugal force.

The functioning of the epicyclic gearing according to the disclosure as a reduction gearing with an integrated axle differential for a motor vehicle powered by an electric motor is as follows:

The drive torque generated by an electric motor, not shown in detail, is transferred to the sun gear S3 via its inner toothing SZ3. The sun gear S3 meshes radially on the inside with the planet gears P1 and drives these planet gears P1. The planet gears P1 are supported on the planet gear pins B via needle bearings L2. The planet gear pins B are supported at both ends in the radial walls C1, T2 and C3 of the planet carrier C. The planet carrier C is an assembled structure here, comprising an integral component GC and the axial cover element C3. The planet gear P1 is coupled in a torsionally rigid manner to the planet gear P2. This is achieved in that a bushing section is formed, extending axially beyond its spur gear toothing, which has a planar outer toothing that meshes with a complementary inner toothing of the first planet gear P1. The second planet gear P2 meshes radially from the inside with a hollow shaft encompassing the planet carrier C at the axial level of the second planet gear plane E2. Due to the rotation of the second planet gear P2 in relation to this hollow shaft, the planet gear P2 moves along the inner circumference of the hollow shaft, and carries the planet carrier C with it, via the planet gear pin B. The planet carrier C supports a spur gear differential SD in an intermediate space between the pockets T. The kinematic coupling of this spur gear differential SD to the planet carrier C is achieved via the planet gear pins B2 of the spur gear differential SD. These pins B2 are seated in holes formed in the middle carrier wall C2 and the cover element C3. The planet gears P3 of the spur gear differential SD sit on these pins B2. A portion of the planet gears P3 meshes radially from the outside with the second sun gear S2. These planet gears P3 are then coupled to one another in pairs, such that they rotate in opposite directions, such that an opposing rotating coupling of the sun gears S1, S2 is obtained. The sun gears S1, S2 are provided with an inner toothing S1Z, S2Z. A torque is provided via this inner toothing S1Z, S2Z to a left-hand and a right-hand wheel drive shaft, or to a front axle and a rear axle.

The drive shaft meshing with the toothing SZ3 of the third sun gear S3 can be a hollow shaft, and the wheel drive shaft meshing with the toothing S1Z can be inserted into this shaft coaxially. Any hollow shaft meshing with the toothing SZ3 can also form the rotor shaft of an electric motor, which drives the sun gear S3. It is also possible to configure the drive for the sun gear S3, with other drive elements, in particular a transmission belt or spur gear, interconnected therein, such that the drive motor can be offset radially to the gearing axis X.

The planet gear carrier C formed by the base element GC and the cover element C3 is supported at both sides via bearings L3, L4. The bearing L3 is a roller bearing, and sits on a collar C1B that extends axially over the first carrier wall C1 on a side facing away from the carrier wall C2. The bearing L3 is likewise a roller bearing, and sits on a collar GD1 provided by the cover element C3, and extends axially over the font surface thereof, on a side facing away from the middle carrier wall C2.

The planet carrier C is comprised of two main components, as explained above, i.e. the base element GC and the cover element C3. The base element GC forms the two adjacent carrier walls C1 and C2, which accommodate the first planet gear plane, and the pockets T, which extend axially from the middle carrier wall C2 toward the cover element. The structures referred to here as pockets are comprised of an axial pocket wall T1 and the pocket base T2. The pockets T are axially open toward the first planet gear plane E1, through the middle carrier wall C2, and also provide a window, open radially toward the outside, through which a portion of the spur gear toothing of the planet gears P2 is exposed radially toward the outside. The pocket bases T2 form a seat T2' on which the cover element C3 is placed, and the pocket bases also form the holes (eyelets) T3 in which the planet gear pins B are seated with an excess. The base element GC functions as a complex spatial structural component that forms both pin holes T5, T4 for the planet gear pins B, and thus also forms a bearing for supporting the stepped planet gear composed of the planet gears P1 and P2 on both sides thereof. The cover element C3 reinforces the support of the planet gear pins B in the region of the pocket base T2 and results in a coupling of all of the planet gear pins B, B2 extending axially out of the second planet gear plane E2. The planet gears P1, P2 can be inserted radially into the base element GC from the outside, together with the needle bearings already received therein, and the planet gear pins B can then be inserted axially into the holes T4, T5. The spur gear differential SD is placed on the middle carrier wall C2 from the side of the pocket base T2. The cover element C3 is then placed on this assembly, and mounted on the base element GC via screws B3 (see FIG. 1). The axial extension of the second planet gear plane E2 is spanned by the structures forming pockets T. The pockets function as webs, as a housing for the planet gears P2, and as pin mounts for supporting the planet gear pins B beyond the first carrier wall C1. The planet gear pins B also function as coupling elements for attaching the cover element C3 to the base element CG in the correct orientation. The axial level assumed by the base sections T2 of the pockets accommodates a sun gear S2 of the spur gear differential SD between the pockets T, such that this structural space can also be used.

The concept according to the disclosure may be implemented such that the base element GC supports three pockets, distributed evenly over the circumference thereof. The concept can also be particularly advantageously implemented with just two pockets T, or four pockets T.

The terms gear plane or planet gear plane E1, E2 are understood to be spatial regions in the context of the present description, in which the respective spur gears P1, P2 are located, and mesh with corresponding counter-gears. This does not refer to a geometrically two dimensional region, but instead spaces, the heights of which substantially correspond to the axial lengths of the of the toothed region of the planet gears P1, P2. The second planet gear plane E2 also comprises the region of the second sun gear S2, the toothing of which extends basically at the axial level of the pocket base T2. The sketches of these planes shown in FIGS. 1 and 2 are merely illustrations, and do not correspond precisely to the actual geometric conditions existing in this exemplary embodiment.

The coupling of the first carrier wall section C1 to the second, i.e. the middle carrier wall section C2, is obtained by cylindrical walls that extend along the outer circumference of this carrier wall section, between the circumferences of the toothing of the planet gears P1. The planet gears P1 can likewise be accommodated by a pocket in the proximity of the first carrier wall section C1, which forms a sufficiently large window in the region where they mesh with the sun gear S3.

The invention claimed is:

1. An epicyclic gearing, comprising: first planet gears in a first planet gear plane, second planet gears in a second planet gear plane a planet carrier that revolves about a gearing axis, comprising a carrier wall extending in an intermediate space between the first planet gear plane and the second planet gear plane, and one or more planet gear pins for supporting the first or second planet gears,
wherein the carrier wall supports a web structure, which extends in a direction of the gear axis, the web structure supports a support structure that extends radially in relation to the gear axis, the support structure has a hole for receiving a section of one of the planet gear pins, wherein the one of the planet gear pins forms an axial excess on a side of the support structure facing away from the carrier wall, and this excess enters in a hole in a carrier plate, which is placed on the support structure, wherein the web structure and the support structure form a pocket supported by the carrier wall, wherein the web structure forms a pocket wall of the pocket that extends axially, and the support structure forms a pocket base in an end region facing away from the carrier wall, which closes off the pocket.

2. The epicyclic gearing of claim 1, wherein a second planet gear of the second planet gear plane is received in the respective pocket, and the carrier plate forms a cover element, which is placed on the pocket bases on respective cover seating surfaces facing away from an interior of the pocket.

3. The epicyclic gearing of claim 2, wherein the planet carrier comprises a first carrier wall section, a second carrier wall section, and a third carrier wall section, wherein the first and second carrier wall sections, and pocket walls and the pocket base are formed by a single-piece base element, and the third carrier wall section is formed by the carrier plate, which is placed on the pocket base provided by the base element.

4. The epicyclic gearing of claim 3, wherein the carrier wall corresponds to the second carrier wall section and is located axially between the first and second carrier wall sections.

5. The epicyclic gearing of claim 4, wherein the base element is made of a casting compound.

6. The epicyclic gearing of claim 5, wherein the second planet gear plane accommodates components of a spur gear differential gearing in an intermediate space laying between the pocket.

7. The epicyclic gearing according to claim 6, wherein the pocket bases extend on an axial level in which a sun gear of the spur gear differential gearing is located.

8. The epicyclic gearing of claim 7, wherein the cover element closes off the second planet gear plane.

9. The epicyclic gearing of claim 8, wherein the pocket forms a structure with a U-shaped radial cross section, and the second planet gear received therein is a spur gear, including toothing of which is partially exposed in the second planet gear plane toward a circumference of the base element, or in that this planet gear meshes radially with a hollow shaft from the inside, which extends into the second planet gear plane, and/or in that the planet gear received in a respective pocket is coupled to a planet gear sharing the same axis of rotation in the first planet gear plane for conjoint rotation therewith.

10. An epicyclic gearing, comprising:
a first set of planet gears arranged on a first planet gear plane;
a second set of planet gears arranged on a second planet gear plane;
a planet carrier configured to circulate about a gear axis and including a carrier wall that extends between the first planet gear plane and the second planet gear plane in an intermediate region, wherein the second planet gear plane accommodates components of a spur gear differential gearing in an intermediate space laying between a pocket, and the planet carrier further includes one or more planet gear pins configured to mount the first and second set of planet gears, wherein a web structure is attached to the carrier wall, wherein the web structure extends in a direction of the gear axis and includes a support structure with a hole for receiving a section of one of the planet gear pins, wherein the web structure includes a support structure that includes a bore configured to receive a portion of one of the planet gear pins.

11. The epicyclic gearing of claim 10, wherein one of the planet gear pins forms an axial projection on a support structure side facing away from the carrier wall, and the projection penetrates a bore of a support plane that rests against the support structure.

12. The epicyclic gearing of claim 10, wherein the planet carrier includes a first, second, and third carrier wall section, wherein the first carrier wall section and the second carrier wall section may be formed by a base element as an integral part thereof, and the third carrier wall section is formed by a carrier plate placed on the integral component.

13. The epicyclic gearing of claim 12, wherein the first and second planet gears are supported on one or more planet gear pins received in holes in a base element with a precision fit.

14. The epicyclic gearing of claim 12, wherein the base element is designed such that a respective pocket base has a receiving hole configured to allow a corresponding section of one of the planet gear pins to be seated.

15. An epicyclic gearing, comprising:
a first set of planet gears arranged on a first planet gear plane;
a second set of planet gears arranged on a second planet gear plane;
a planet carrier configured to circulate about a gear axis and including a carrier wall that extends between the first planet gear plane and the second planet gear plane in an intermediate region, and the planet carrier further includes one or more planet gear pins configured to mount the first or second set of planet gears, wherein a web structure is attached to the carrier wall, wherein the web structure extends in the direction of the gear axis and includes a support structure that extends radially in relation to the gear axis and that includes a hole for receiving a section of one of the one or more planet gear pins, wherein the one of the one or more planet gear pins forms an axial excess on a side of the support structure facing away from a support wall, wherein the support structure includes a bore configured to receive a portion of one of the planet gear pins wherein the web structure and the support structure form a pocket supported by the carrier wall, wherein the web structure forms a pocket wall of the pocket that extends axially, and the support structure forms a pocket base in an end region facing away from the carrier wall, which closes off the pocket.

16. The epicyclic gearing of claim 14, wherein the excess passes through a hole in a carrier plate placed on the support structure.

17. The epicyclic gearing of claim 16, wherein the second planet gear plane accommodates components of a spur gear differential gearing in an intermediate space laying between the pocket.

* * * * *